United States Patent [19]

Ariyoshi et al.

[11] Patent Number: 5,091,947
[45] Date of Patent: Feb. 25, 1992

[54] SPEECH RECOGNITION METHOD AND APPARATUS

[75] Inventors: Takashi Ariyoshi; Toshiki Kawamoto, both of Yokohama; Seigou Yasuda, Yokosuka; Syoji Kuriki; Tomofumi Nakatani, both of Yokohama, all of Japan

[73] Assignee: Ricoh Company, Ltd., Japan

[21] Appl. No.: 566,884

[22] Filed: Aug. 13, 1990

Related U.S. Application Data

[63] Continuation of Ser. No. 202,375, Jun. 6, 1988, abandoned.

[30] Foreign Application Priority Data

| Jun. 4, 1987 | [JP] | Japan | 62-140344 |
| Jun. 8, 1987 | [JP] | Japan | 62-143672 |
| Feb. 4, 1988 | [JP] | Japan | 63-25326 |
| May 23, 1988 | [JP] | Japan | 63-126847 |

[51] Int. Cl.[5] .............................. G10L 5/00
[52] U.S. Cl. .................................... 381/42
[58] Field of Search ............ 364/531.5; 381/41–45

[56] References Cited

U.S. PATENT DOCUMENTS

| 4,400,828 | 8/1983 | Pirz et al. | 381/43 |
| 4,467,437 | 8/1984 | Tsuruta et al. | 364/513.5 |
| 4,601,054 | 7/1986 | Watari et al. | 381/43 |
| 4,694,493 | 9/1987 | Sakoe | 381/42 |
| 4,716,593 | 12/1987 | Hirai et al. | 381/42 |

FOREIGN PATENT DOCUMENTS

| 0191354 | 8/1986 | European Pat. Off. |
| 3129282 | 2/1983 | Fed. Rep. of Germany |
| 3129353 | 2/1983 | Fed. Rep. of Germany |
| 3216800 | 3/1988 | Fed. Rep. of Germany |

OTHER PUBLICATIONS

Elenius et al., "Effects of Emphasizing Transitional or Stationary Parts of the Speech Signal in a Discrete Utterance Recognition System", IEEE Proc. of the Int'l. Conf. on ASSP 1982, pp. 535–538.

Copy of brochure entitled "Voice Master Key a Voice Recognition System," *Voice Master & Speech Thin*, Date Unknown (ordered Feb. 14, 1989, and obtained by inventor on Apr. 12, 1989).

*Primary Examiner*—Dale M. Shaw
*Assistant Examiner*—David D. Knepper
*Attorney, Agent, or Firm*—Mason, Fenwick & Lawrence

[57] ABSTRACT

A voice recognition apparatus includes a coefficient memory for storing at least one coefficient for correcting a degree of similarity which is obtained by either one of the speaker-independent recognition and the speaker-dependent recognition. The apparatus also includes a voice identification circuit for comparing the degrees of similarity of the candidates obtained by either one of the speaker-independent recognition and the speaker-dependent recognition with corrected degrees of similarity of the candidates related to the other recognition type which are obtained by performing a predetermined operation to the degree of similarity of each candidate which is supplied from the other recognition type. Then the voice identification decides one candidate having the highest degree of similarity to be an identification result.

10 Claims, 15 Drawing Sheets

FIG. 4A

|   | CANDIDATE | DEGREE OF SIMILARITY |
|---|---|---|
| 1 | WI 1 | SI 1 |
| 2 | WI 2 | SI 2 |
| ⋮ | ⋮ | ⋮ |
| n | WI n | SI n |

FIG. 4B

|   | CANDIDATE | DEGREE OF SIMILARITY |
|---|---|---|
| 1 | WD 1 | SD 1 |
| 2 | WD 2 | SD 2 |
| ⋮ | ⋮ | ⋮ |
| n | WD n | SD n |

FIG. 4C

| FLAG | CANDIDATE | DEGREE OF SIMILARITY |
|---|---|---|
| 1 | WI 1 | $k_2 \cdot SI\ 1$ |
| 1 | WI 2 | $k_2 \cdot SI\ 2$ |
| 0 | WD 1 | SD 1 |
| ⋮ | ⋮ | ⋮ |

FIG. 4D

| FLAG | CANDIDATE | DEGREE OF SIMILARITY |
|---|---|---|
| 0 | WD 1 | SD 1 |
| 0 | WD 2 | SD 2 |
| 1 | WI 1 | $k_2 \cdot SI\ 1$ |
| ⋮ | ⋮ | ⋮ |

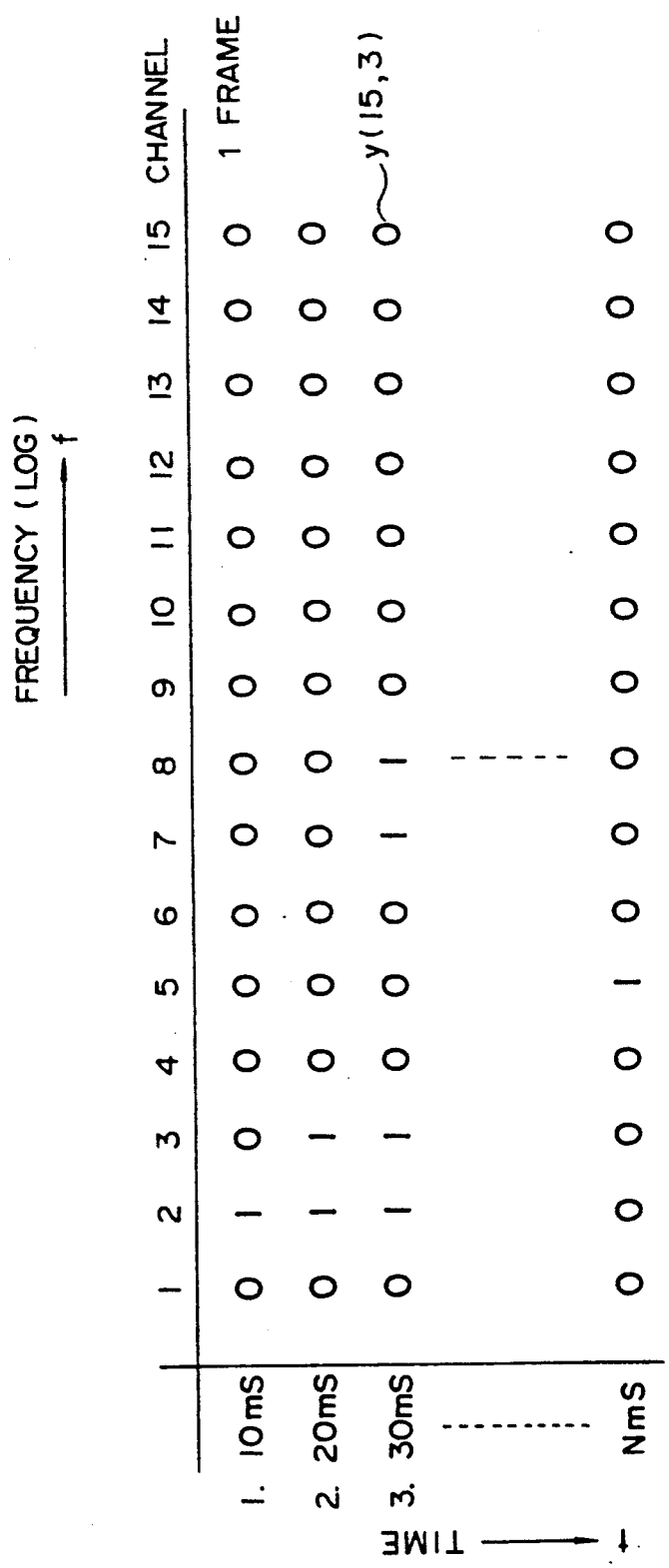

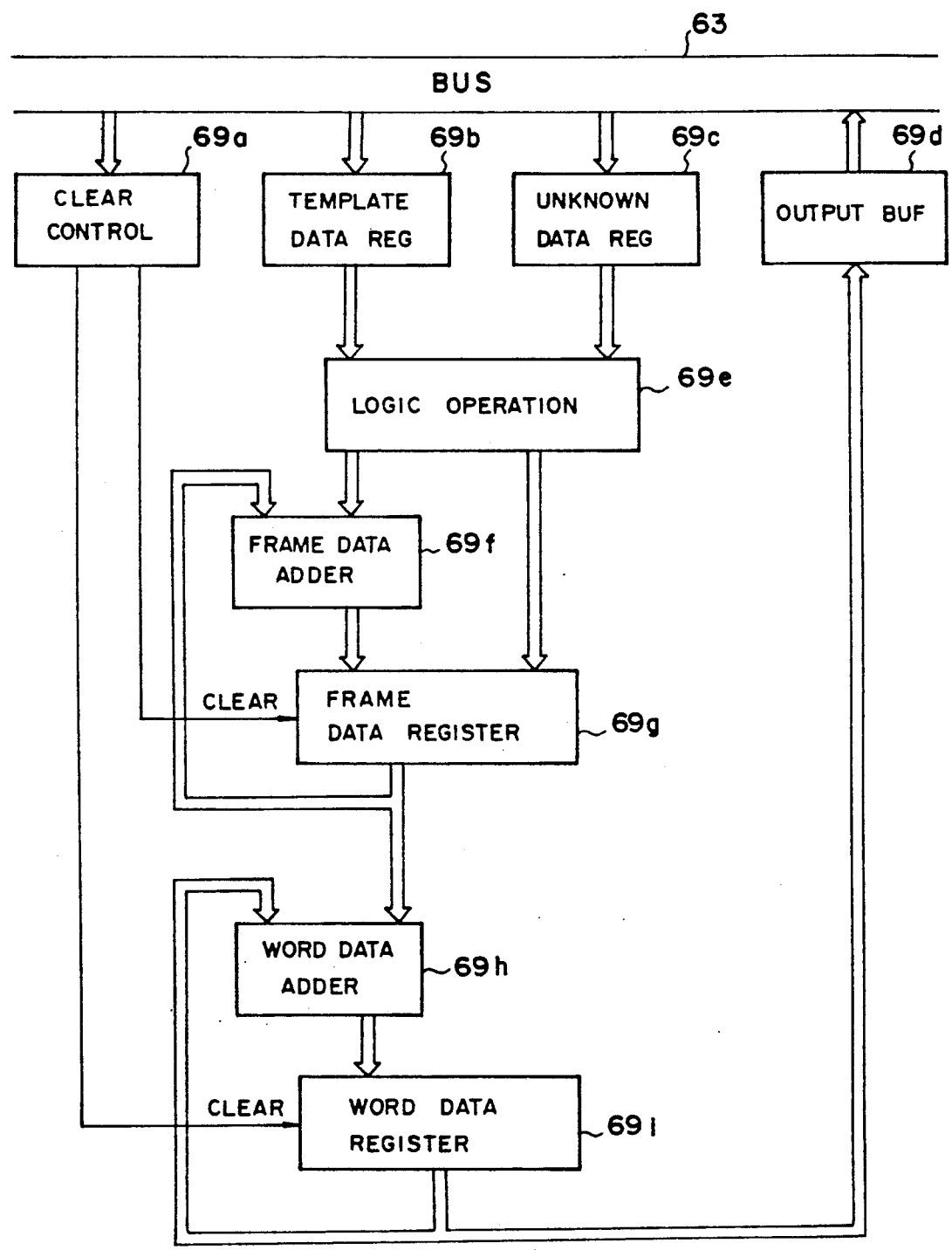

FIG. 12A
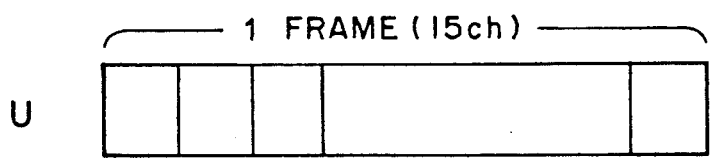
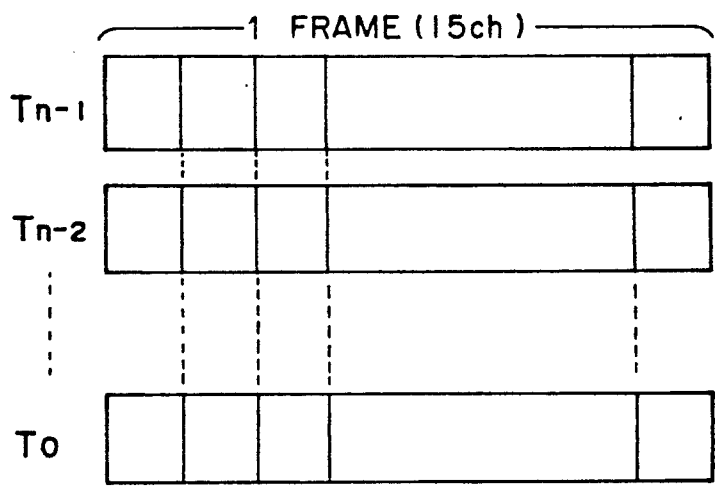
FIG. 12B
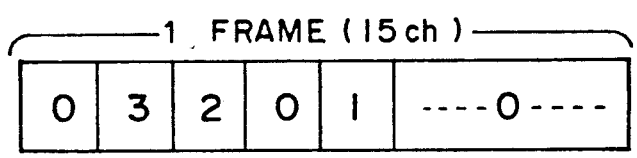
FIG. 13A
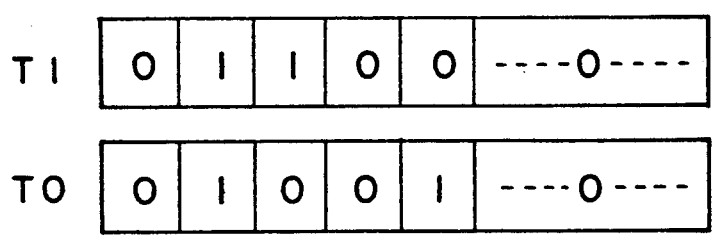
FIG. 13B
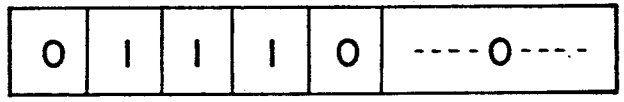
FIG. 13C

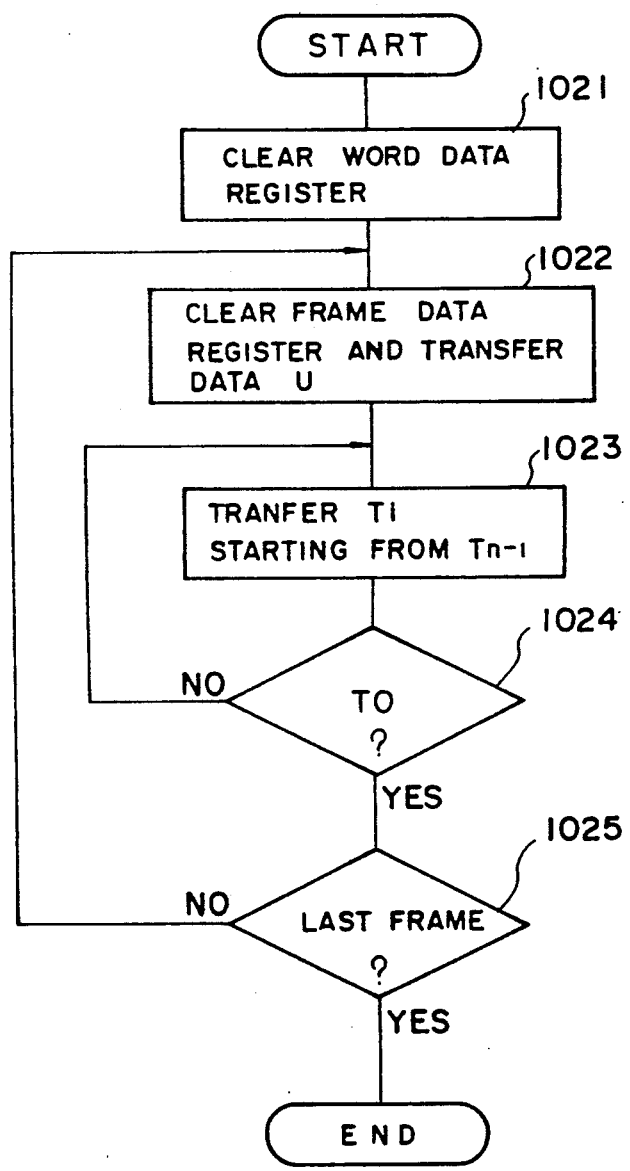

SPEECH RECOGNITION METHOD AND APPARATUS

This application is a continuation of U.S. patent application Ser. No. 07/202,375, filed June 6, 1988, now abandoned.

BACKGROUND OF THE INVENTION

The present invention generally relates to voice recognition, and in particular to a voice recognition method and an apparatus using the same capable of carrying out both speaker-independent recognition and speaker-dependent recognition. The present invention may be suitably applied to voice response systems such as a voice dialing system and a voice word processing system.

Voice recognition is a well-known technology for identifying an unknown input voice pattern by comparing it with a stored reference pattern and calculating a degree of similarity therebetween. Voice recognition may be classified into two types, i.e., speaker-independent recognition and speaker-dependent recognition. The conventional speaker-independent recognition uses a dictionary designed exclusively for storing reference patterns of spoken words for the speaker-independent recognition. Likewise, the conventional speaker-dependent recognition uses a dictionary designed exclusively for storing reference patterns of words for the speaker-dependent recognition. A reference pattern for the speaker-independent recognition is produced on the basis of voices uttered by a plurality of speakers in order to eliminate a specific pattern depending on an individual. A reference pattern for the speaker-dependent recognition is produced for each individual, and therefore contains a specific pattern inherent in an individual. Therefore, a reference voice pattern of a word for the speaker-independent recognition is different from a reference voice pattern of the same word for the speaker-dependent recognition. That is, both the speaker-independent and speaker-dependent reference patterns for one spoken word are not equivalent to each other. It is to be noted that it is very difficult to produce a dictionary used in common for the speaker-independent and speaker-dependent recognition processes in the current stage of the voice recognition technology.

It is known that there has been proposed a voice recognition apparatus capable of performing both the speaker-independent recognition and the speaker-dependent recognition. Such an apparatus contains two dictionaries; one of which is used for the speaker-independent recognition and the other is used for the speaker-dependent recognition. In this case, a reference voice pattern of a word is stored in either one of the two dictionaries. For example, a voice pattern of a word which may be often used by many persons is registered in the dictionary for the speaker-independent recognition. In operation, when an unknown input voice is supplied to the system, a pattern of the input voice is compared with the reference patterns for the speaker-independent recognition and is also compared with the reference patterns for the speaker-dependent recognition. In this operation, there are obtained degrees of similarity between the input voice pattern and the reference patterns for the speaker-independent recognition, and degrees of similarity between the input voice pattern and the reference patterns for the speaker-dependent recognition. Then, a voice having the highest degree of similarity is selected as a first candidate of the unknown input voice from among the calculated degrees of similarity.

However, the above voice recognition has a disadvantage that an error in recognition often occurs. For example, the apparatus often selects the first candidate having the highest degree of similarity from among the reference patterns stored in the dictionary for the speaker-independent recognition, even when the input voice is uttered by a person whose voice has been registered in the dictionary for the speaker-dependent recognition. Of course, if this is the case, the selected first candidate is incorrect. An incorrect candidate or candidates subsequent to the first candidate may be selected from among the candidates obtained by the recognition type which does not match with the speaker. Alternatively, the apparatus often selects the first candidate from among the registered voices stored in the dictionary for the speaker-dependent recognition, even when the input voice is uttered by speaker whose voices have not been registered in the dictionary for the speaker-dependent recognition. Also, an incorrect candidate or candidates subsequent to the first candidate may be selected. Originally, the degrees of similarity with respect to the speaker-independent recognition and the speaker-dependent recognition cannot be equivalently handled, because there is a difference in the reference pattern and algorithm therebetween.

In addition, the apparatus must contain two different processors; one of which is used exclusively for the speaker-independent recognition and the other of which is used exclusively for the speaker-dependent recognition. Correspondingly, a hardware used for the voice recognition is considerably large.

SUMMARY OF THE INVENTION

Accordingly, a general object of the present invention is to provide a voice recognition method and apparatus using the same in which the above disadvantages have been eliminated.

A more specific object of the present invention is to provide a voice recognition method and apparatus using the same which can carry out a voice identification with a high accuracy by removing the above-described tendency.

Another object of the present invention is to provide a voice recognition apparatus in which both the speaker-independent recognition and speaker-dependent recognition can be carried out by using a reduced quantity of hardware.

The above objects of the present invention can be achieved by a voice recognition apparatus including the following structural elements. A feature extracting circuit extracts features of an unknown input voice and produces a corresponding unknown voice pattern. A speaker-independent reference pattern dictionary stores speaker-independent reference patterns. A speaker-dependent reference pattern dictionary stores speaker-dependent reference patterns. A speaker-independent recognition circuit calculates a degree of similarity between the unknown input pattern and each of the speaker-independent reference patterns and produces a plurality of candidates for the unknown input pattern. A speaker-dependent recognition circuit calculates a degree of similarity between the unknown input pattern and each of the speaker-dependent reference patterns and produces a plurality of candidates for the unknown input pattern. A coefficient memory stores at least one coefficient for correcting the degree of similarity which is obtained by either one of the speaker-independent recognition circuit or the speaker-dependent recognition circuit. A voice identification circuit compares the degrees of similarity of the said candidate supplied from either one of the speaker-independent recognition circuit or the speaker-dependent recognition circuit with corrected degrees of similarity of the said candidate related to the other recognition circuit which are obtained by performing a predetermined operation to the degree of similarity of each candidate which is supplied from the other recognition circuit. The voice identification circuit also decides one candidate having the highest degree of similarity to be an identification result out of the candidates supplied from the speaker-independent recognition circuit and the speaker-dependent recognition circuit.

The above objects can be also attained by a voice pattern recognition method comprising the following steps. The first step is a step of producing an unknown input voice pattern of an unknown input voice from features extracted from the unknown input voice. The second step is a step of calculating a degree of similarity between the produced unknown pattern and reference patterns which are composed of reference patterns used exclusively for speaker-independent recognition and reference patterns used exclusively for speaker-dependent recognition. The third step is a step of correcting the degree of similarity of each candidate with respect to either one of the speaker-independent recognition and the speaker-dependent recognition by subjecting said degree of similarity to a predetermined operation. The fourth step is a step of deciding one candidate having the highest degree of similarity to be an identification result.

Other objects, features and advantages of the present invention will become apparent from the following detailed description when read in conjunction with the accompanying drawings.

BRIEF DESCRIPTION OF THE DRAWINGS

FIGS. 4A through 4D are views for explaining the operation of the structure shown in FIG. 2;

FIG. 9 is a view for explaining a binary time-spectrum pattern of an unknown input voice pattern;

FIG. 11 is a block diagram of a similarity element calculating unit shown in FIG. 7;

FIGS. 12A and 12B are views for explaining the operation of the similarity element calculating unit shown in FIG. 11;

FIGS. 13A through 13C are views for explaining an example of the calculation executed by the similarity element calculating circuit shown in FIG. 11;

FIG. 14 is a flowchart showing the operation of the similarity element calculating circuit shown in FIG. 11.

DETAILED DESCRIPTION

Figure 1:
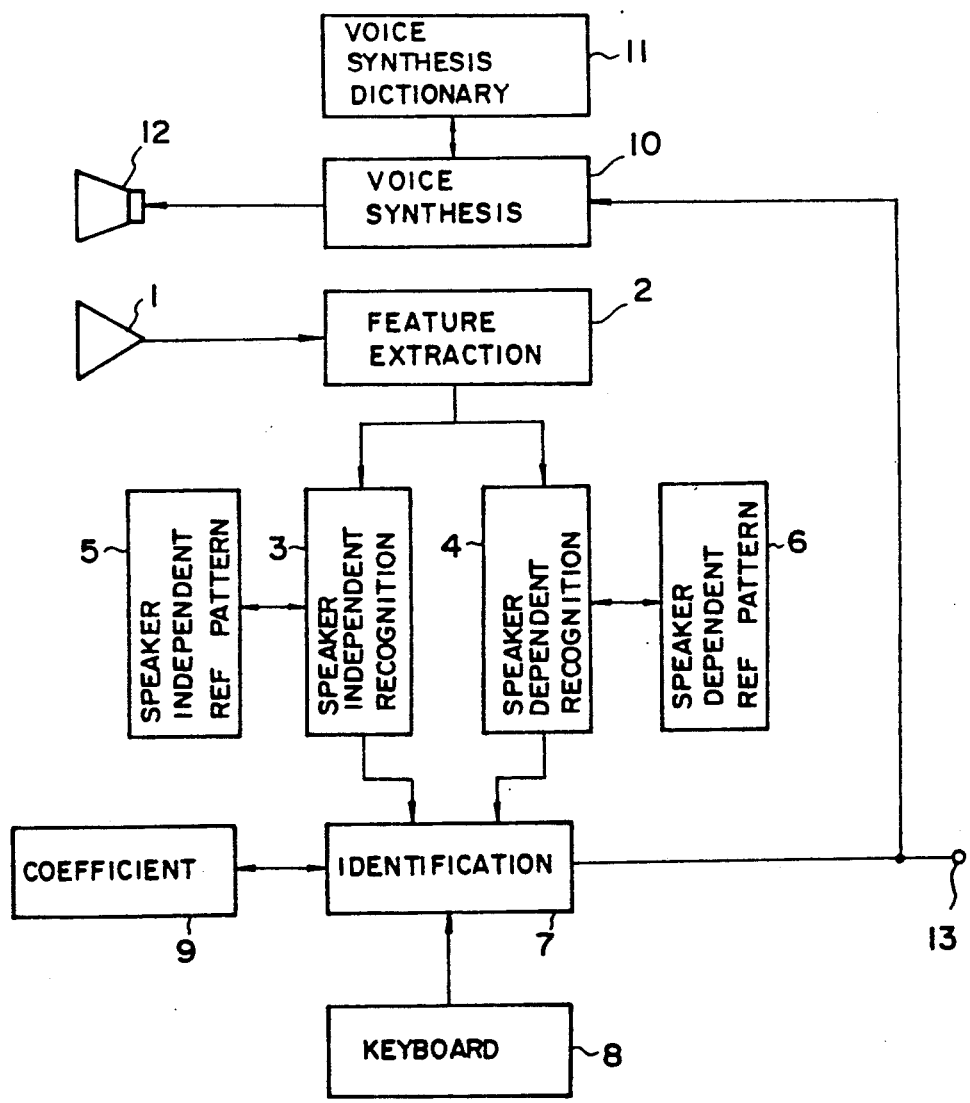
FIG. 1 is a block diagram of an preferred embodiment of the present invention.

FIG. 1 shows a block diagram showing a preferred embodiment of the present invention. Referring to FIG. 1, a microphone 1 converts a voice which is a vibration of air to a corresponding electric voice signal. A feature extracting circuit 2 extracts quantities of features of the voice signal from the microphone 1 and generates an unknown voice pattern. Currently, various methods for extracting features of a voice have been proposed, and any one of them can be used for constructing the feature extracting circuit 2. However, as will be described in detail later, it is preferable to employ a feature extracting method based on binary time-spectrum pattern matching (BTSP). A speaker-independent recognition circuit 3 performs matching between the unknown voice pattern produced by the feature extracting circuit 2 and reference voice patterns for the speaker-independent recognition which are stored in a speaker-independent reference pattern dictionary 5. Then the speaker-independent recognition circuit 3 outputs a plurality of candidates for the unknown voice. In this case, all the candidates having degrees of similarity more than a predetermined threshold level may be outputted, and alternatively a predetermined number of candidates may be outputted. Although any one of algorithms for the speaker-independent recognition may be used for constituting the speaker-independent recognition circuit 3, it is preferable to utilize algorithm based on the BTSP matching. A speaker-dependent recognition circuit 4 performs matching between the unknown voice pattern supplied from the feature extracting circuit 2 and speaker-dependent reference voice patterns which are stored in a speaker-dependent reference pattern dictionary 6. Then the speaker-dependent recognition circuit 4 outputs a plurality of candidates for the unknown voice. Although any one of algorithms for the speaker-dependent recognition may be used for constructing the speaker-dependent recognition circuit 4, it is preferable to utilize algorithms based on the BTSP matching.

A voice identification circuit 7 has a function of multiplying a coefficient k supplied from a coefficient memory 9 and a degree of similarity of each of a predetermined number of candidates which are supplied from the speaker-independent recognition circuit 4. A coefficient k has a function of correcting a degree of similarity of a candidate obtained by the speaker-independent recognition and thereby reducing the occurrence of an error in recognition. In the coefficient memory 9, there are stored a plurality of different values of the coefficients k such as $k_1$, $k_2$ and $k_3$ having different values, and any one of them may be selected by an instruction from the voice identification circuit 7.

The voice identification circuit 7 has another function of arranging the candidates obtained by the speaker-independent recognition and the candidates obtained by the speaker-dependent recognition in the decreasing order of the degree of similarity, starting from the highest degree of similarity. It is to be noted that the degree of similarity for each candidate obtained by the speaker-independent recognition has been corrected by the coefficient k. The voice identification circuit 7 may output candidates one by one, starting from the highest degree of similarity to a voice synthesis circuit 10 in response to an instruction from a keyboard 8. The voice synthesis circuit 10 carries out voice synthesis by using a corresponding voice synthesis pattern which is read out from a voice synthesis reference pattern dictionary 11. The voice synthesis reference pattern dictionary 11 stores a plurality of voice synthesis reference patterns therein. A synthesized voice is outputted to a speaker 12, which converts it to a corresponding vibration of air.

Figure 2:
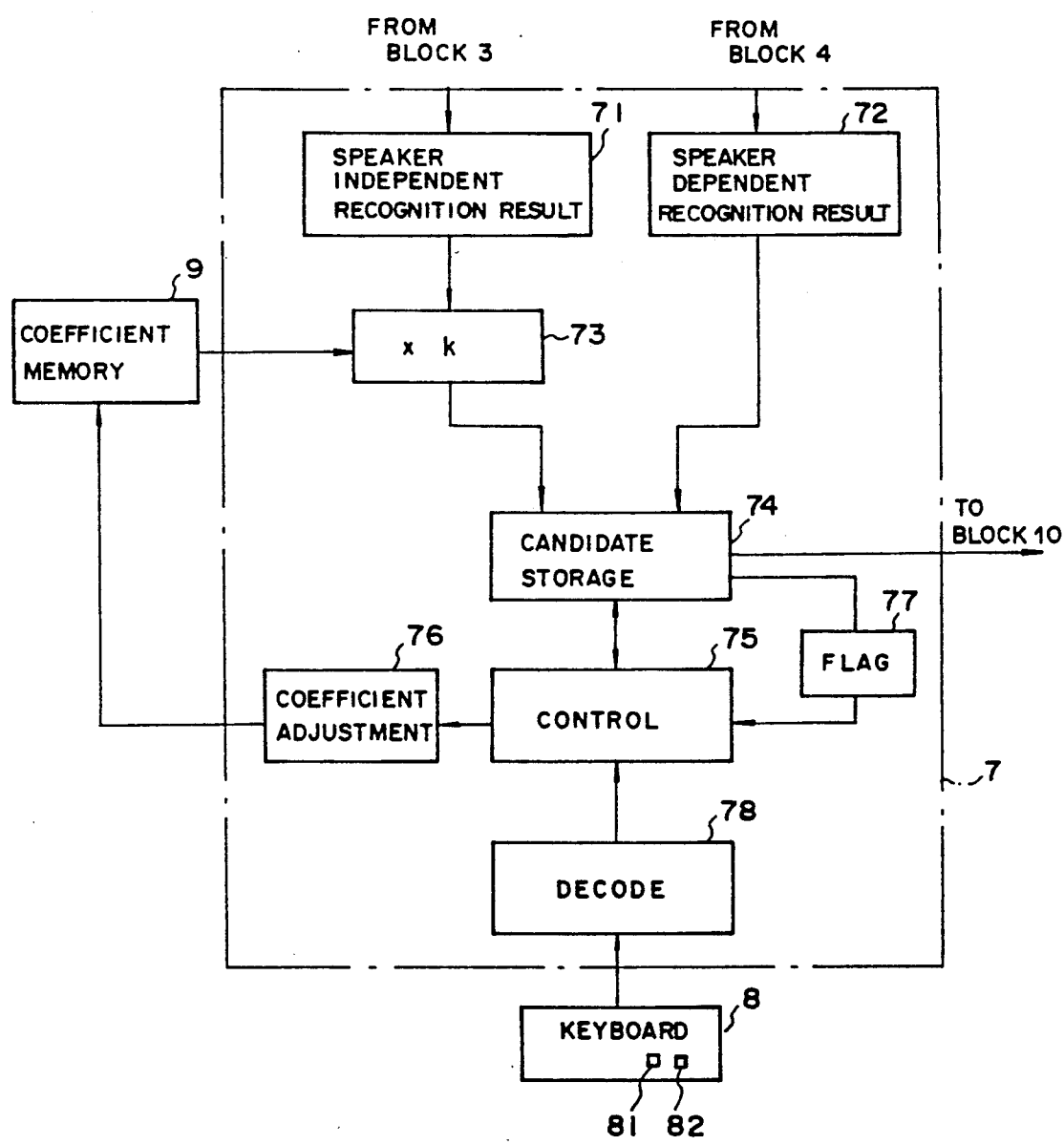
FIG. 2 is a block diagram showing a detailed configuration of a voice identification circuit shown in FIG. 1.

FIG. 2 is a block diagram showing a detailed structure of the voice identification circuit 7 shown in FIG. 1. The voice identification circuit 7 includes a memory 71, a memory 72, a coefficient multiplying circuit 73, a candidate storage memory 74, a controller 75, a coefficient adjusting circuit 76, a flag register 77 and a decode circuit 78. The memory 71 is used for storing results obtained at the speaker-independent recognition circuit 3, that is, a degree of similarity of each of the candidates. The memory 72 is used for storing results obtained at the speaker-dependent recognition circuit 4, i.e., a degree of similarity of each of the candidates. The coefficient multiplying circuit 73 multiplies a coefficient k and the degree of similarity of each of the candidates which are supplied from the memory 71. As described before, coefficient k has the function of correcting the degrees of similarity obtained by the speaker-independent recognition and thereby reducing an error in recognition. Multiplication results, i.e., corrected degrees of similarity are supplied to the candidate storage memory 74. The degrees of similarity obtained by the speaker-dependent recognition are supplied directly to the candidate storage memory 74. The candidates stored in the candidate storage memory 74 are arranged therein in the decreasing order of the degree of similarity, by the controller 75. It is to be noted that the degree of similarity of each candidate obtained by the speaker-independent recognition has been corrected by the coefficient k. When output of one candidate is instructed by the controller 75 in response to an instruction supplied from the keyboard 8, one candidate having the highest degree of similarity out of the stored candidates is outputted to the voice synthesis circuit 10. At the same time, a flag used for indicating that the outputted candidate is concerned with the speaker-independent recognition or the speaker-dependent recognition, is written into the flag register 77. The controller 75 can generate an instruction for adjusting the coefficient k to be set at the multiplying circuit 73 when a predetermined condition which will be described later is detected. This instruction of the coefficient adjustment is supplied to the coefficient adjusting circuit 76, which outputs a corresponding memory address to the coefficient memory 9.

Figure 3A:
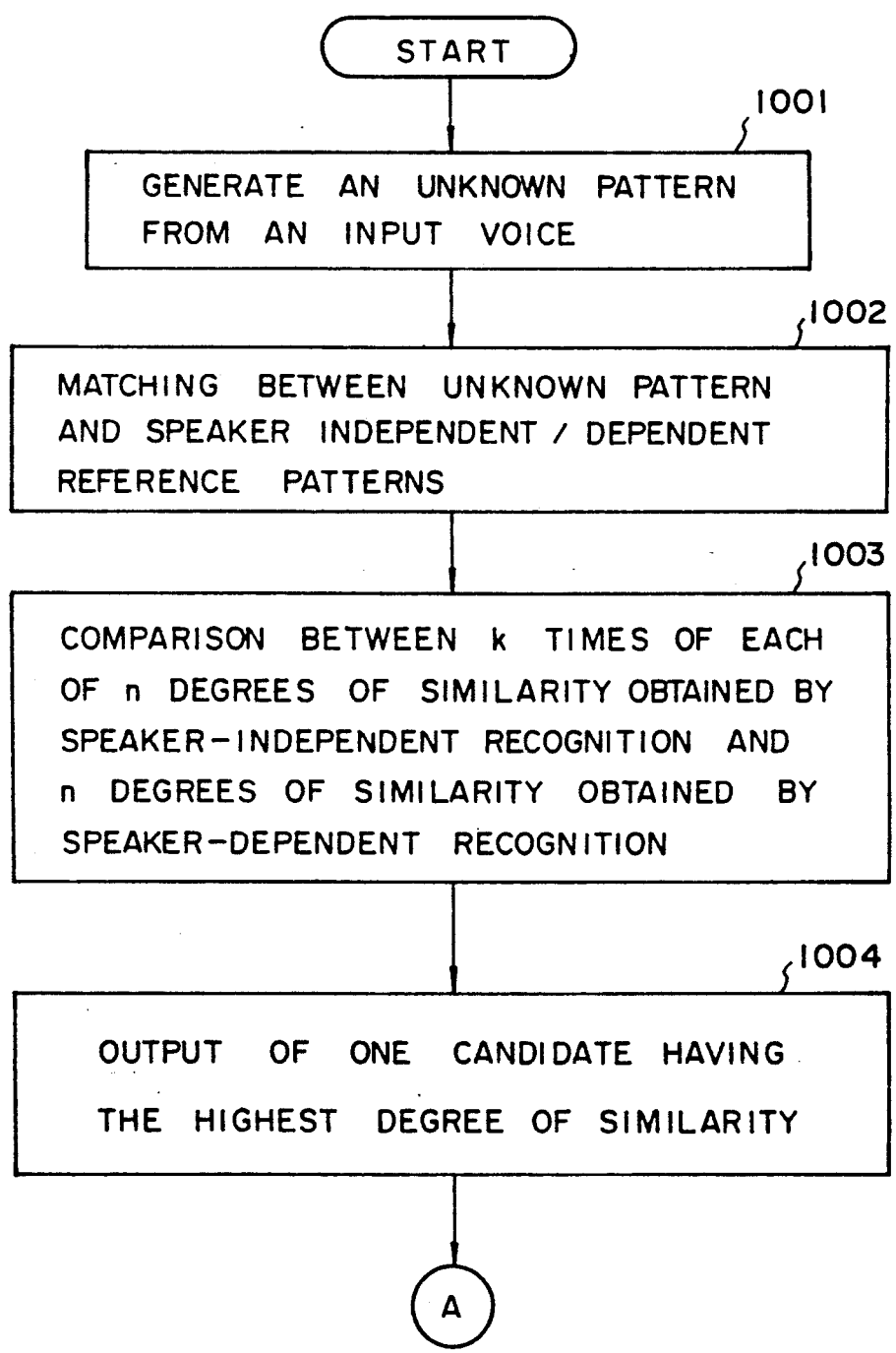
FIG. 3A and 3B are flowcharts for explaining the operation of the apparatus shown in FIG. 1.

A description is given of an operation of the embodiment shown in FIGS. 1 and 2 with reference to FIGS. 3. In the following description, it is assumed that the coefficient memory 9 stores three different coefficients $k_1$, $k_2$ and $k_3$ ($k_1 > k_2 > k_3$), and the coefficient $k_2$ is initially set in the multiplying circuit 73 of the voice identification circuit 7.

In operation, a voice uttered by a person is converted to a corresponding electric signal by the microphone 1, which is then supplied to the feature extracting circuit 2. The feature extracting circuit 2 generates an unknown voice pattern of the input voice by extracting features thereof (step 1001 of FIG. 3A). The unknown voice pattern is supplied to the speaker-independent recognition circuit 3 and also to the speaker-dependent recognition circuit 4. The speaker-independent recognition circuit 3 selects n number of candidates for the input voice having the highest degree obtained by the matching (step 1002). Similarly, the speaker-dependent recognition circuit 4 selects n number of candidates for the input voice having the highest degree obtained by the matching (step 1002). It is now assumed that n number of candidates obtained by the speaker-independent recognition are represented in the decreasing order of the degree of similarity, as follows:

WI1, WI2, ..., WIn and a degree of similarity of each candidate is represented as follows:

SI1, SI2, ..., SIn.

Further, it is assumed that n number of candidates obtained by the speaker-dependent recognition are represented in the decreasing order of the degree of similarity as follows:

WD1, WD2, ..., WDn and a degree of similarity of each candidate is represented as follows:

SD1, SD2, ..., SDn.

The candidates WI1, WI2, ..., WIn are stored in the memory 71 together with the degrees of similarity SI1, SI2, ..., SIn, as shown in FIG. 4A. Likewise, the candidates WD1, WD2, ..., WDn are stored in the memory 72 together with degrees of similarity SD1, SD2, ..., SDn, as shown in FIG. 4B.

The degrees of similarity SI1, SI2, ..., SIn which are obtained by the speaker-independent recognition are multiplied by the coefficient $k_2$ at the multiplying circuit 73, and calculated results $k_2$.SI1, $k_2$.SI2, ..., $k_2$.SIn are supplied to the candidate storage memory 74. On the other hand, the degrees of similarity SD1, SD2, ..., SDn which are obtained by the speaker-dependent recognition are supplied directly to the candidate storage memory 74. When all the candidates (i.e., 2n number of candidates) for the unknown input voice have been transferred to the candidate storage memory 74, the controller 75 starts to arrange all the candidates in the decreasing order of the degree of similarity by comparing them with each other. It is now assumed that the degrees of similarity are arranged in a sequence of $k_2$.SD1, $k_2$.SD2, SD1, ..., in the decreasing order of the degree of similarity, as shown in FIG. 4C. Then the controller 75 instructs the candidate storage memory 74 so as to output one candidate having the highest degree of similarity. In the above assumption, the candidate WI1 is read out from the memory 74 and is supplied to the voice synthesis circuit 10. At this time, a flag having a value of "1" is registered into the flag register 77. A value of "1" of the flag indicates that the candidate which is now read out from the memory 74 is a candidate obtained by the speaker-independent recognition, and a value of "0" of the flag indicates that the candidate which is now read out is a candidate obtained by the speaker-dependent recognition.

The voice synthesis circuit 10 reads out a voice synthesis pattern corresponding to the candidate WI1 from the voice synthesis dictionary 11, and outputs a synthesized voice to the speaker 12. Therefore, the speaker can know whether or not the uttered voice has been correctly recognized.

As described previously, the direct comparison in the degrees of similarity between the speaker-independent recognition and the speaker-dependent recognition is not reasonable, because the recognition algorithm and the method of producing reference patterns are different between the speaker-independent recognition and the speaker-dependent recognition. On the other hand, the use of the correction coefficient k makes it possible to equivalently handle the degree of similarity obtained by the speaker-independent recognition and the degree of similarly obtained by the speaker-dependent recognition. As a result, the occurrence of an error in recognition can be reduced such that an incorrect candidate is often selected from either one of the speaker-independent and dependent recognition results (candidates), and is presented to the speaker. Such an error in recognition may be extremely reduced by using a plurality of coefficient values. This is because a different recognition result may be obtained depending on a circumstance where the speaker-independent reference patterns are produced, a recognition circumstance, and so on.

Figure 3B:
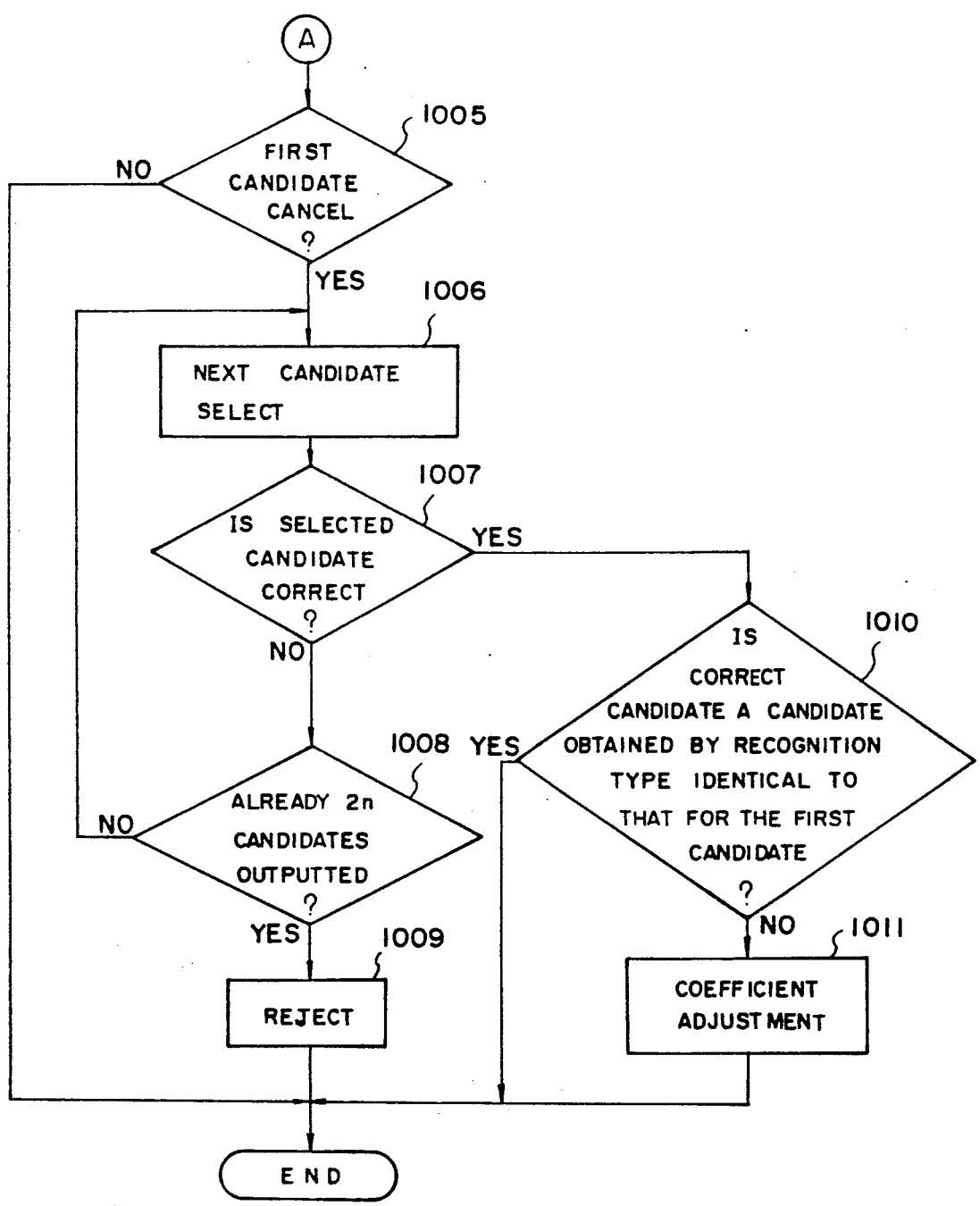

In the above operation, if the first candidate WI1 is incorrect, the speaker depresses a cancel key 81 provided on the keyboard 8 in order to cancel the first candidate WI1 and request the next candidate (step 1005 of FIG. 3B). The decode circuit 78 discriminates the depression of the cancel key 81 and instructs the controller 75 to output the next candidate. Then, the controller 75 selects the next candidate (WI2 in the above example) and supplies it to the voice synthesis circuit 10 (step 1006). Then, a synthesized voice corresponding to the candidate WI2 is outputted through the speaker 12. Then, it is checked whether the selected candidate is correct or not (step 1007). If the selected candidate WI2 is also incorrect, the process proceeds to step 1008, where it is checked, by the controller 75, as to whether or not all the candidates (2n) have been read out from the candidate storage memory 74. In the case where the selected candidate is incorrect, the content of the flag register 77 is not updated. If all the candidates have been read out, the recognition process is rejected. Alternatively if the discrimination result at step 1008 is NO, the process returns to step 1006. Then the next candidate (third candidate WD1) is selected in response to the depression of the cancel key 81. If the candidate WD1 is correct and therefore a confirmation key 82 is depressed, the process proceeds to step 1010, where it is checked whether the selected candidate is a candidate obtained by the recognition type (speaker-independent recognition or speaker-dependent recognition) which is identical to that for the cancelled candidate. This discrimination can be carried out by using the flag stored in the flag register 77. If the incorrect first candidate and the correct candidate are candidates obtained by the same speaker recognition type, the process ends. For example, if the second candidate WI2 is correct, the process ends. Alternatively if the correct candidate is obtained by the recognition type which is different from that for the cancelled first candidate, the process proceeds to step 1011. At step 1011, the value of the coefficient k is adjusted in a manner described in detail below.

In the example of FIG. 4C, the value set in the flag register 77 is changed to "0", when the correct candidate WD1 is read out from the candidate storage memory 74. Therefore it can be found that the recognition type for the third candidate WD1 (i.e., speaker-independent recognition) is different from that for the first candidate WI1. Then the process proceeds to step 1011 where the current value of the coefficient k is adjusted. In the above example, the first and second candidates WI1 and WI2 which are obtained by the speaker-independent recognition are incorrect, and the third candidate WD1 which is obtained by the speaker-dependent recognition is correct. This means that the coefficient $k_2$ which is currently set at multiplying circuit 73 is larger than an appropriate value. Therefore, the controller 75 supplies the coefficient adjusting circuit 76 with a control signal indicating that the coefficient $k_3$ which is smaller than the coefficient $k_2$ should be set in the circuit 73. The coefficient adjusting circuit 76 supplies the coefficient memory 9 with an address of the coefficient $k_3$. Thereby, the coefficient $k_2$ set in the multiplying circuit 73 is substituted with the coefficient $k_3$ (step 1011). As a result, the coefficient k may be set to an appropriate value.

The adjustment of the coefficient k is also carried out in the following case. It is now assumed that as shown in FIG. 4D, candidates are arranged in a sequence of WD1, WD2, WI1, ... in the decreasing order of the degree of similarity, and a correct candidate is the candidate WI1. That is, candidates WD1 and WD2 which have degrees of similarity higher than that of the candidate WI1. In this case, two candidates WD1 and WD2 obtained by the speaker-dependent recognition have been cancelled at step 1005, and the candidate WI1 which is one of the recognition results by the speaker-independent recognition. This means that the current coefficient k having a value of $k_2$ is a smaller than an appropriate value. Therefore, the coefficient k is adjusted to have a value larger than $k_2$, that is, $k_1$ in the above example.

Further, in the example of FIG. 4C, if the candidate WI2 is correct, the adjustment of the coefficient k is not carried out. This is a simple error within the independent-speaker recognition. As is seen from the above explanation, when the correct candidate has the same recognition type as the cancelled candidate, the adjustment of the coefficient k is not carried out. Likewise, in the example of FIG. 4D, if the candidate WD2 is correct, the adjustment of the coefficient k is not carried out.

Values of the coefficient k may be selected in accordance with an experiment. Although three values of the coefficient k are used in the above embodiment, the present invention is not limited thereto. An increased number of values of the coefficient may increase an accuracy in the voice recognition. Although the degree of similarity obtained by the speaker-independent recognition is corrected by multiplying the coefficient to it, the degree of similarity may be corrected by adding the coefficient k thereto, or using the combination of multiplication and addition. Further, the correction of the degree of similarity may be possible with respect to the degree of similarity with respect to the speaker-dependent recognition. In this case, a coefficient 1/k may be multiplied to the degree of similarity obtained by the speaker-dependent recognition. Moreover, in the case where the structure of FIGS. 1 and 2 is applied to a voice response apparatus such as a voice dialing apparatus, the confirmed or correct candidate may be supplied thereto through a terminal 13. Further, in place of or in addition to the voice synthesis circuit 10, a display unit may be used for confirming the candidate by the operator.

Figure 5:
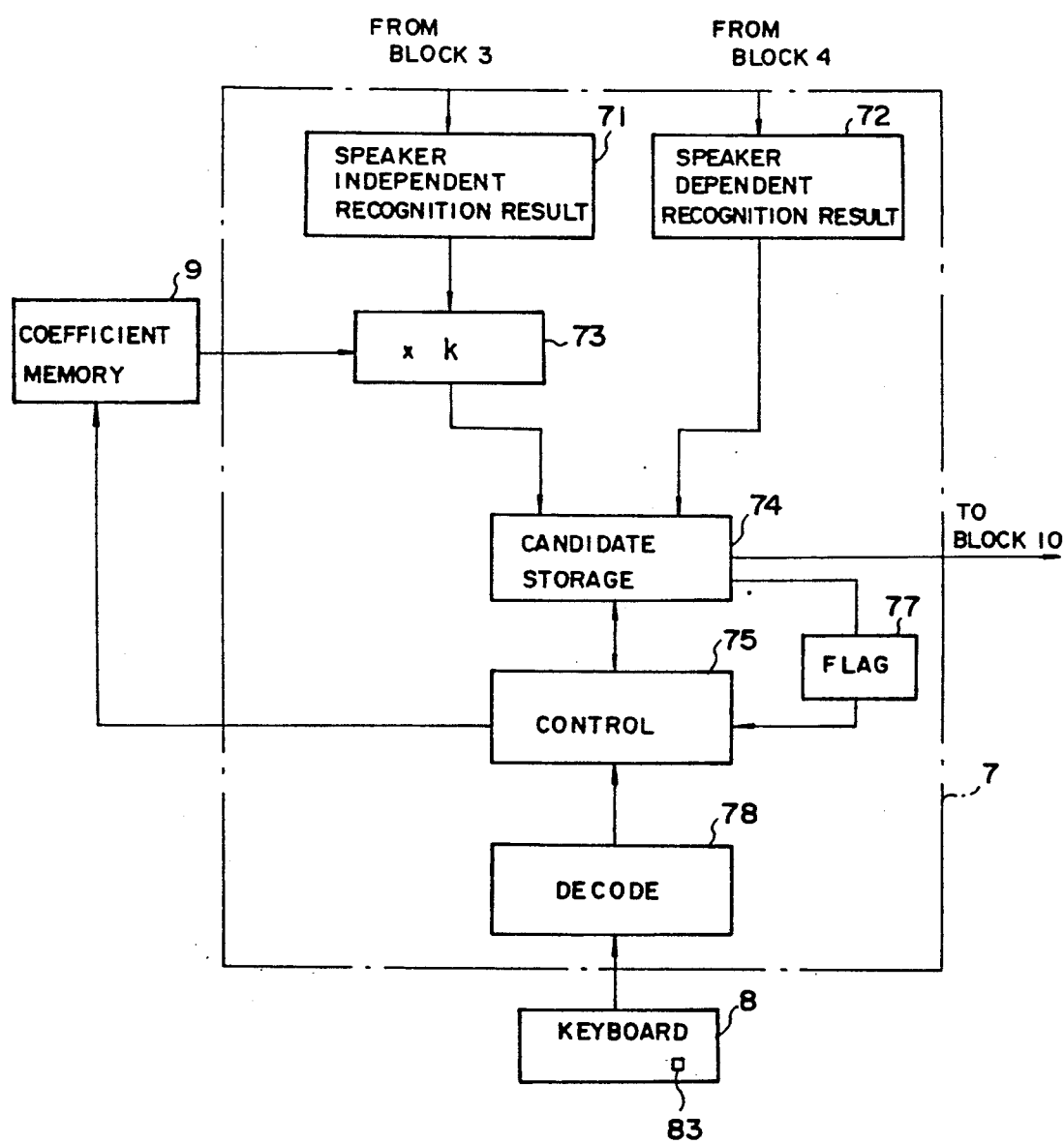
FIG. 5 is a block diagram showing another configuration of the voice identification circuit shown in FIG. 1.

FIG. 5 is a block diagram of a variation of the configuration of FIG. 2. In FIG. 5, the same elements as those in FIG. 2 are denoted by the same reference numerals as those therein. In FIG. 2, the coefficient k is automatically adjusted. On the other hand, in the structure of FIG. 5, the coefficient k may be manually adjusted. The keyboard 8 has a coefficient setting key 83 which is used for indicating the coefficient k having a desired value such as $k_1$, $k_2$ and $k_3$ ($k_1 > k_2 > k_3$). Every time the coefficient setting key 83 is depressed, one value of the coefficient k may be selected in sequence. When the key 81 is depressed, a corresponding signal is supplied to the decoder 78, which feeds a corresponding address to the coefficient memory 9. Then, the coefficient k having a value designated by the address from the decoder 78 is outputted to the multiplying circuit 73.

A description is given of an application of the embodiment described above, by referring to FIG. 6.

Figure 6:
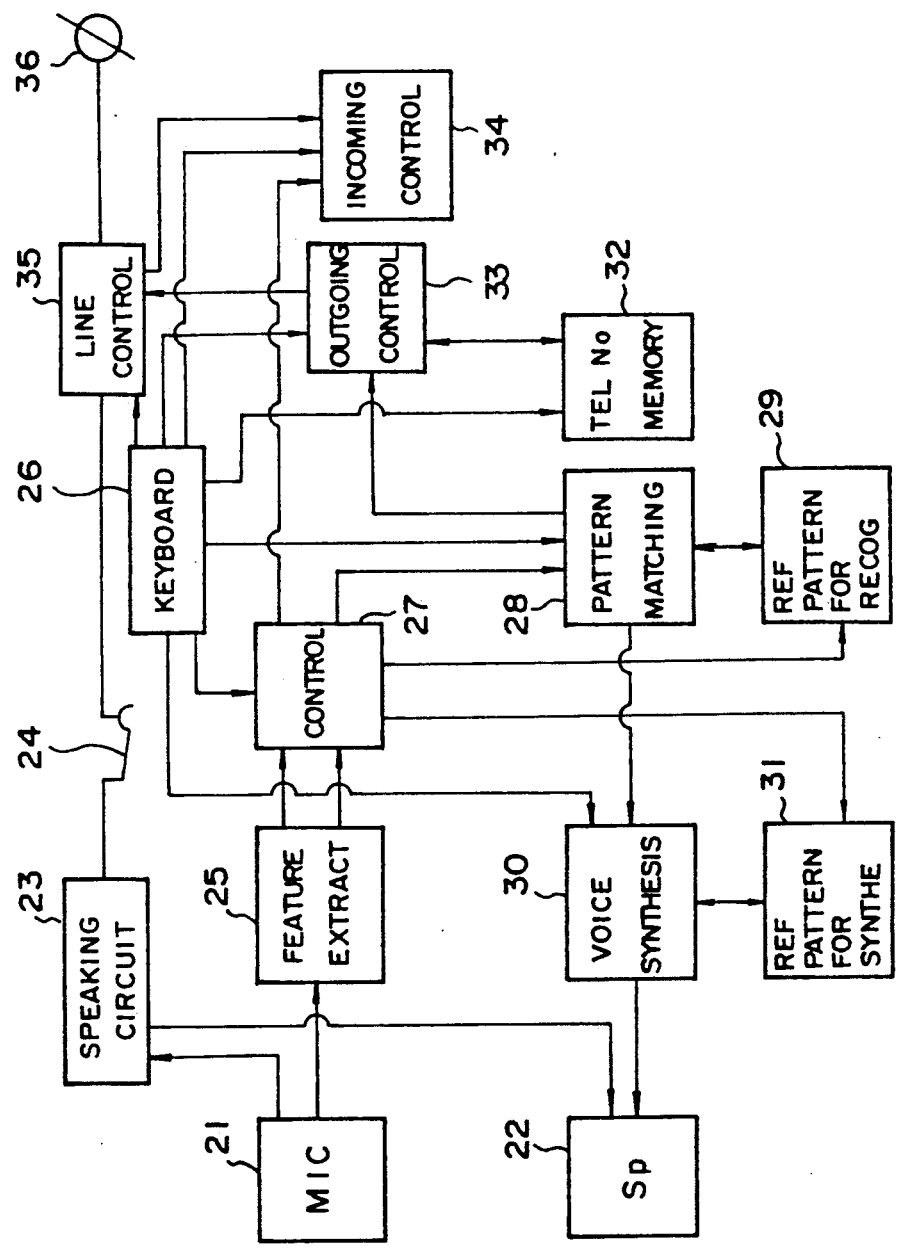
FIG. 6 is a block diagram of a voice dialing apparatus which is an application of the present invention.

FIG. 6 is a block diagram of a voice (speech) dialing apparatus. The illustrated voice dialing apparatus includes a microphone 21, a speaker 22, a speaking circuit 23, a hook switch 24, a feature extracting circuit 25, a keyboard 26, a control circuit 27, a pattern matching circuit 28, a reference voice pattern dictionary 29, a voice synthesis circuit 30, a voice synthesis reference pattern dictionary 31, a telephone number memory 32, an outgoing controller 33, an incoming controller 34, a line controller 35 and a line 36. The pattern matching circuit 28 corresponds to the combination of speaker-independent recognition circuit 3, the speaker-dependent recognition circuit 4, the voice identification circuit 7 and the coefficient memory 9 shown in FIG. 1. The reference pattern dictionary 29 corresponds to the combination of the speaker-independent reference pattern dictionary 5 and the speaker-dependent reference pattern dictionary 6 shown in FIG. 1. The feature extracting circuit 25, the voice synthesis circuit 30 and the voice synthesis reference pattern dictionary 31 correspond to the feature extracting circuit 2, the voice synthesis circuit 10 and the voice synthesis reference pattern dictionary 11 shown in FIG. 1, respectively. The microphone 21, the speaker 22 and the keyboard 26 correspond to the microphone 1, the speaker 12 and the keyboard 8 of FIG. 1, respectively.

Features of the illustrated application exist in the structure of the matching circuit 8 and the structure of each of the reference pattern dictionary 29, the voice synthesis reference pattern dictionary 31 and the telephone number memory 32. The matching circuit 8 is constructed in accordance with the above-described embodiment. Therefore, an explanation of the matching circuit 8 is omitted.

FIG. 6 is a view showing a storage region of each of the reference pattern dictionary 29, the voice synthesis reference pattern dictionary 31 and the telephone number memory 32. Each of the storage regions are divided into two regions; one of which is a writable region I and the other is a write inhibit region II. The reference pattern dictionary 29 consists of the speaker-independent reference pattern dictionary 5 which is formed in the write inhibit region II, and the speaker-dependent reference pattern dictionary 6 which is formed in the writable region I. The speaker-independent reference pattern dictionary 5 stores a plurality of reference voice patterns of spoken words which may be often used by many persons. For example, speaker-independent reference voice patterns of telephone numbers of public organizations such as police, fire/ambulance, weather report, and time. For one spoken telephone number, a plurality of speaker-independent reference patterns are stored in the write inhibit region I. The speaker-dependent reference pattern dictionary 6 stores speaker-dependent reference patterns which may be arbitrarily registered by users. The voice synthesis reference pattern dictionary 31 stores, in the write inhibit region II, one voice synthesis reference pattern for each of telephone numbers, and stores in the writable region I, one voice synthesis reference pattern for each of the reference patterns which are set by users. Similarly, telephone numbers which may be selected by the speaker-independent recognition, are stored in the write inhibit region II of the telephone number memory 32, and telephone numbers which may be selected by the speaker-dependent recognition, are stored in the writable region I.

At the commencement of speech dialing, a speaker instructs the execution of speech dialing to the controller 27 by using the keyboard 26. Then a speech produced by the speaker is fed to the feature extracting circuit 25 through the microphone 21. The feature extracting circuit 25 produces an unknown voice pattern and supplies it to the controller 27. The controller 27 feeds the unknown voice pattern to the pattern matching circuit 28. The pattern matching circuit 28 decides the first candidate for the unknown voice in accordance with the process described above with reference to FIGS. 1 through 5. The first candidate is supplied to the voice synthesis circuit 30, which reads out a voice synthesis reference pattern corresponding to the first candidate and produces the synthesized voice. Then the synthesized voice is outputted to the speaker through the speaker 22. At this time if the first candidate is incorrect, the speaker depresses the cancel key 81 described before. In response to the cancel key, the pattern matching circuit 28 outputs the second candidate to the voice synthesis circuit 30. Then, the synthesized voice corresponding to the second candidate is outputted to the speaker. At this time if the second candidate is correct, the speaker depresses the confirmation key 82 provided in the keyboard 26. Then the controller 27 causes the pattern matching circuit 28 to send the second candidate to the outgoing controller 33. The outgoing controller 33 reads out the telephone number corresponding to the second candidate from the telephone number memory 32, and sends it to the line 36 through the line controller 35.

The speech dialing apparatus of FIG. 6 has a high reliability and performance because the pattern matching circuit 28 has the structure of the embodiment described before. In addition, since dial information on public organizations which may be often used by many users are registered beforehand, it is unnecessary for the user to register the reference patterns of the telephone numbers thereof.

A description is given of a further detailed structure of the embodiment of FIGS. 1 and 2.

Figure 7:
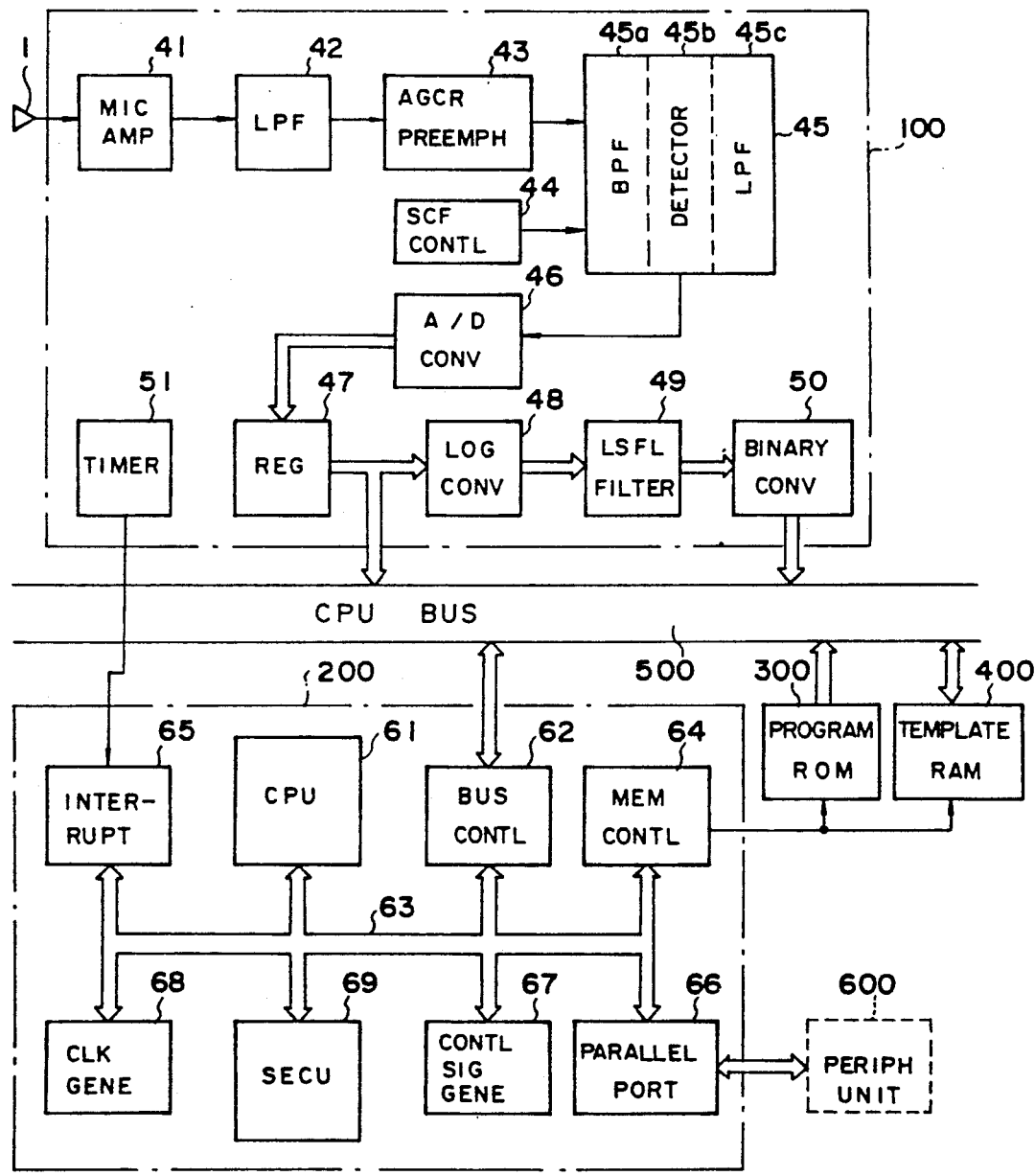
FIG. 7 is a block diagram of an apparatus which achieves the configuration shown in FIG. 1.

FIG. 7 is a block diagram showing a further detailed structure of the configuration of FIGS. 1 and 2. The illustrated voice recognition apparatus includes a processor 100 having a function of extracting features of an unknown input voice, a processor 200 having functions of identifying the unknown voice and performing other processings, a program read only memory (program ROM) 300, a template (reference) random access memory (template RAM) 400, a CPU bus 500 and a peripheral unit 600. The processor 100 corresponds to the feature extracting circuit 2 shown in FIG. 2, and the processor 200 corresponds to the combination of the speaker-independent recognition circuit 3, speaker-dependent recognition circuit 4, voice identification circuit 7 and coefficient circuit 9 of FIG. 1. A program for executing the speech recognition is stored in the program ROM 300. That is, the ROM 300 stores a program for the speaker-independent recognition which is carried out at the block 3 of FIG. 1, and a program for the speaker-dependent recognition which is carried out at the block 4. It is to be noted that as will be described in detail later, elements for obtaining the degree of similarity are calculated by a hardware structure. The template RAM 400 corresponds to the combination of speaker-independent and dependent reference pattern dictionaries 5 and 6 of FIG. 1. The CUP bus 500 connects the processors 100 and 200, ROM 300 and RAM 400 to one another. The peripheral unit 600 corresponds to the keyboard 8, voice synthesis circuit 10, voice synthesis reference pattern dictionary 11 and speaker 12 of FIG. 1.

The processor 100 is a large scale integrated circuit designed for extracting features of unknown input voice and producing a power spectrum and a binary time-spectrum pattern at an interval of 10 ms. The power spectrum and binary time-spectrum pattern have been described in the U.S. patent Ser. No. 596,586, the assignee of which is the same as that of the present invention. The processor 100 contains the following structural parts.

A microphone amplifier 41 amplifies the voice signal supplied from the microphone 1. A lowpass filter 42 cuts off unnecessary high frequency components contained in the amplified voice signal in order to remove loop noise which occurs at the time of sampling of the input voice signal. An automatic gain control amplifier and preemphasis circuit 43 sets a level of the voice signal within an appropriate level range, and then emphasizes high frequency components of the output of the lowpass filter 42 in order to compensate power thereof. A block 45 consists of a bandpass filter 45a, a detector 45b and a lowpass filter 45c, produces a power spectrum of the input voice signal at an interval of $\frac{1}{3}$ oct. within a range of 250 kHz to 6.35 kHz. A Q value of the block 45 is set to 6. A switched-capacitor filter controller 44 controls the bandpass filter 45a, detector 45b and lowpass filter 45c of the block 45, which is constructed by switched-capacitors. An analog-to-digital converter 46 converts the power spectrum data of the input voice signals to digital values of 8 bits. A register 47 stores the power spectrum data in the digital form. A LOG converter 48 converts the power spectrum data to data on the logarithmic axis. An LSFL filter 49 performs correction using the least square root error approximate line in order to normalize the sound source characteristics of a speaker. A binary converter 50 assigns a binary value "1" to a channel out of 15 channels which has a value equal to or more than one-half of each local peak in the power spectrum, and assigns a binary value "0" to a channel having a value smaller than one-half of each local peak.

A further explanation of the log converter 48, LSFL filter 49 and binary converter 50 is given below. As is well known, a time-spectrum pattern (TSP) may be used as feature quantities for speech recognition. The time-spectrum pattern includes a transfer characteristic of a throat and a sound source characteristic. A peak observed in the time-spectrum pattern is defined as a local peak. Further, the fact is well known that the frequency characteristics of the human voice chards are attenuated in a high frequency range and that the frequency characteristics are considerably varied depending on an individual. For the above reasons, the voice signal is corrected by using the least square root error approximation line before binary-valued process. With respect to frequency data of the voice signal which is obtained at an interval of 10 ms, the least square fit line is calculated. Then a value on the calculated line is subtracted from the frequency data. Thereafter, the corrected frequency data is subjected to the binary-valued process.

Figure 8A:
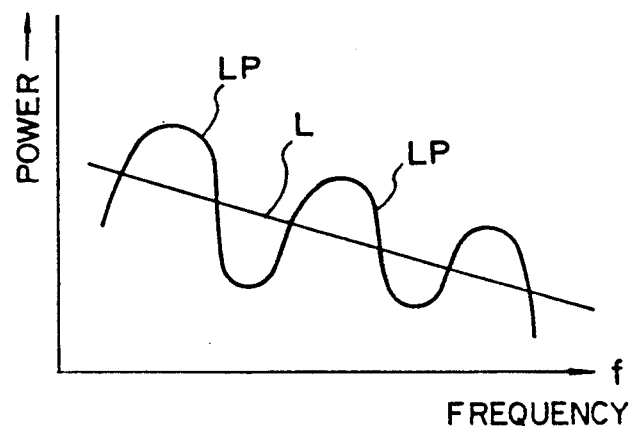
FIGS. 8A and 8B are graphs for explaining a fundamental processing in the voice recognition processing based on a binary time-spectrum pattern processing.
Figure 8B:
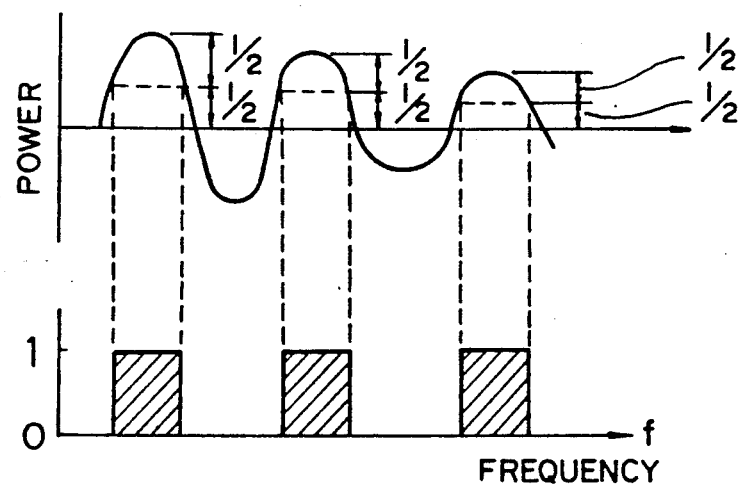

FIG. 8A shows an example of a time-spectrum pattern obtained at the output of the block 45, and FIG. 8B shows the corrected time-spectrum pattern obtained at the output of the LSFL filter 49 and also shows a binary time-spectrum pattern obtained at the output of the binary converter 50. A character L denotes the least square fit line and a character LP denotes a local peak. As described before, in the present system, the voice signal is divided into 15 channels and therefore, the binary converter 50 outputs the binary time-spectrum pattern of a two-dimensional frequency-time pattern as shown in FIG. 9.

A timer 51 generates a pulse having a constant period (10 ms) and outputs it as an interrupt signal to the processor 200.

The processor 200 is constructed by an large-scale integration circuit which has a function of performing voice recognition processing and other processings. The processor 200 contains the following structural parts.

A central processing unit (CPU) 61 is a general 16-bit CPU core and executes the program stored in the program ROM 300, which is externally connected to the processor 200. A bus controller 62 controls an internal bus 63 which is built in the processor 200, and a CPU bus 500 which is externally provided the processors 100 and 200. A memory controller 64 supplies the program ROM 300 with a chip select signal. An interrupt controller 65 inputs the timer signal from the processor 100 and performs the interrupt control. A parallel port 66 is used for communicating with the peripheral unit 600. A control signal generator 67 generates various control signals which are used into the processor 200. A clock generator 68 generates baud rate clock which is necessary when a serial interface is externally connected to the processor 200. A similarity element calculation unit (hereafter simply referred to as SECU) 69 inputs the unknown input pattern described in the form of the binary time-spectrum pattern as shown in FIG. 9, and a template pattern which is a reference pattern derived from the template RAM 400. Then the SECU 69 calculates, at a high speed, values of elements Pd, Py, Pv and Pi necessary for obtaining the degree of similarity between the unknown input pattern and the template pattern. The SECU 69 can calculate the degree of similarity based on each of the speaker-independent recognition and the speaker-dependent recognition. The above four elements will be described in detail later.

The program ROM 300 stores a control program having the following contents which are executed by the CPU 61 and memory controller 64 provided in the processor 200. A first control program controls an operation such that when the interrupt signal derived from the timer 51 is applied to the interrupt controller 65, the CPU 61 enters the binary time-spectrum pattern from the binary converter 50 through the CPU bus 500 and bus controller 62. A second control program controls an operation such that the CPU 61 detects a voice section in the binary time-spectrum pattern. The detected voice section is decided to be an unknown input pattern and is then presented for comparison with the reference pattern. In the comparison between the unknown voice pattern and the reference pattern, the conventional line shrinking or narrowing method is preferably employed to compensate a variation in the frequency and time of the unknown pattern. For example, the well-known line narrowing methods have been disclosed in Japanese Electronic Communications Society Report PRL-75-66, pp. 49-56. A third control program controls an operation such that the unknown input voice pattern is supplied to the SECU 69, and the template pattern stored in the template RAM 400 is supplied to the SECU 69 in accordance with the memory transfer under control of the memory controller 64, and that the CPU 61 receives elements Pd, Py, Pv and Pi from the SECU 69. A fourth control program controls an operation such that the CPU 61 calculates the degree of similarity between the unknown input pattern and each of the template patterns by using the calculated values of the four elements, and selects one template having the highest degree of similarity.

The template RAM 400 corresponds to the combination of the speaker-independent reference pattern dictionary 5 and the speaker-dependent reference pattern dictionary 6.

The degree of similarity Syi between the unknown input pattern and one template pattern is defined as follows:

$$Syi = [Pv/(Pd-Pv)] \cdot [Pi/(Py-Pi)] \quad (1)$$

where $$Pd = \sum_f \sum_t mi(f,t),$$

$$Pv = \sum_f \sum_t mi(f,t) \cdot y(f,t),$$

$$Py = \sum_f \sum_t y(f,t),$$

and $$Pi = \sum_f \sum_t mi(f,t) \cap y(f,t).$$

In the above equations, "." denotes a multiplication, "f" denotes a frequency and corresponds to each channel, "t" denotes a time and corresponds to each frame, and "$\eta$" denotes an AND operation (when y=1 and mi>0, a result of the AND operation is 1, and in the other cases, a result of the AND operation is 0). One frame denotes a group of data of 15 channels obtained at each interval of 10 ms, as shown in FIG. 9. A function of "y(f,t)" denotes a value positioned at the frequency-time coordinates (f,t) of the unknown input pattern. For example, as shown in FIG. 9, y(15,3)=0.

Figure 10:
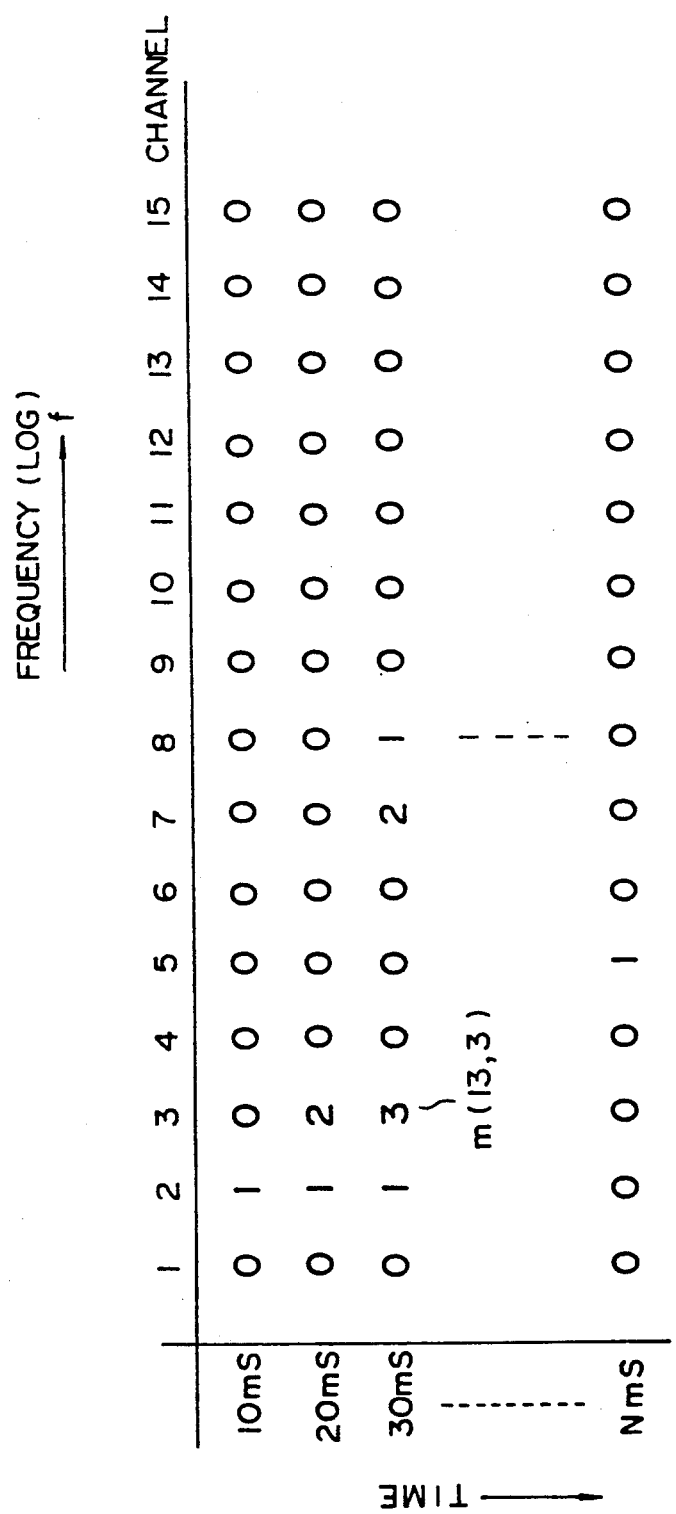
FIG. 10 is a view for explaining a template (reference) pattern used in the binary time-spectrum pattern processing.

FIG. 10 shows one template pattern of one word which is a reference pattern. A function of "mi(f,t)" denotes a value positioned at the frequency-time coordinates (f,t) of the template pattern. For example, as shown in FIG. 10, mi(3,3)=3 (in the decimal notation). Generally, one template pattern is produced by adding a plurality of patterns together. For example, in the case where the template pattern of FIG. 10 is produced from three patterns, a value "3" positioned at the coordinates (3,3) of the template pattern means that a value at the coordinates (3,3) of each of the three patterns is "1". In general, in the case where a value of each channel of the unknown input pattern is represented with one bit, and the number of channels forming one frame is m, one frame of the unknown input pattern can be represented with m bits. In the example of FIG. 9, one frame of the unknown input pattern can be represented with 2 bytes. On the other hand, in the case where a value of each of the m channel of the template pattern is represented with n bits, one frame thereof can be represented by n×m bits. For example, one frame of the template pattern of FIG. 10 can be represented by 4 bytes.

As will be seen from the above description, the element Pd corresponds to the sum of values included in one template pattern. The element Py corresponds to the number of a value "1" contained in one unknown input pattern. The element Pi corresponds to the number of a point on the coordinates (f,t) at which neither unknown input pattern nor the template pattern have a value of "0". The element Pv corresponds to the sum of a value positioned at each of the above point on the coordinate (f,t) of the template pattern.

The calculation of the formula (1) is carried out by the SECU 69. It is now assumed that as shown in FIG. 12A, one frame of the unknown input pattern is denoted by U (15 channels: 16 bits). It is further assumed that a value of each of the 15 channels is composed of n bits. In this case, it is possible to handle one-frame of the template pattern as shown in FIG. 12B. That is, a group of the most significant bit of each channel is represented by $T_{n-1}$, the following most significant bit of each channel is represented by $T_{n-2}$, each of the subsequent bits is represented in this manner. And, the least significant bit of each channel is represented by $T_0$. For example, as shown in FIG. 13A, in the case where a value of each channel is represented by 2 bits, i.e., n=2, one-frame can be divided into two parts $T_1$ and $T_0$. The $T_1$ is a group of the most significant bit ($\times 2^1$) of each channel, and $T_0$ is a group of the least significant bit ($\times 2^0$) thereof. The SECU 69 is designed to calculate the elements Pd, Py, Pv and Pi of the degree of similarity shown in formula (2) by using data U, $T_{n-1}, T_{n-2}, \ldots, T_0$.

FIG. 11 is a block diagram showing a detailed structure of the SECU 69. The SECU 69 contains the following structural parts. A clear controller 69a clears a frame data register 69g and a word data register 69i. An unknown data register 69c is a 16-bit register for temporarily storing the one frame of the unknown input pattern U. A template data register 69b is a 16-bit register for sequentially storing data $T_{n-1}, T_{n-2}, \ldots, T_0$ corresponding to one frame of the template pattern of one word. A logic operation circuit 69e carries out a logic operation between the data stored in the template data register 69b and data stored in the unknown data register 69c, and produces data with respect to the elements Py, Pi, Pd and Pv for describing the degree of similarity. The data with respect to the elements Py and Pi are fed to a frame data register 69g, and the data with respect to the elements Pd and Pv are fed to a frame data adder 69f. The frame data register 69g is a register for temporarily storing the elements with respect to one frame. The frame data adder 69f adds the data supplied from the logic operation circuit 69e to data which is obtained by shifting the data read out from the frame data register 69g by one bit in the high-order direction. The above data shifting operation corresponds to doubling the value represented by the data. A word data register 69i is a register for storing calculated values of the elements Py, Pi, Pd and Pv with respect to the whole of the template pattern of the one word. A word data adder 69f adds each of the elements Py, Pi, Pd and Pv stored in the word data register 69i to the respective elements stored in the frame data register 69g. An output buffer 69d is a buffer for transferring each element stored in the word data register 69i to the data bus 63.

FIG. 14 is a flowchart showing the operation of the SECU 69. Referring to FIG. 14, the word data register 69i is cleared (step 1021). Then frame data register 69g is cleared and at the same time the data U amounting to one frame of the unknown input pattern is transferred to the unknown data register 69c (step 1022). Thereafter, one frame of the template data is sequentially transferred to the template data register 69b, starting from the data $T_{n-1}$ (step 1023). The step 1023 is repetitively carried out until the last data $T_0$ is transferred (step 1024). Then, the sequence composed of steps 1022, 1023 an 1024 is repetitively carried out until all the frames have been processed (step 1025).

In accordance with the above process, the SECU 69 carries out the following calculations. In the formula (2), each of y(f,t) and mi(f,t)∩y(f,t) assumes a value of one-bit. Therefore, elements Py and Pi for one frame, that is, $$\sum_f y(f,t)$$

and $$\sum_f mi(f,t) \cap y(f,t)$$

are transferred to the frame register 69g immediately after all the data $T_{n-1}, T_{n-2}, \ldots, T_0$ have been transferred to the template data register 69b.

On the other hand, each of mi(f,t) and mi(f,t) y(f,t) assumes a value of n bits. Therefore elements Pd and Pv for one frame, that is, $$\sum_f mi(f,t)$$

and $$\sum_f mi(f,t) \cdot y(f,t)$$

are obtained as follows. First, the element mi(f,t) is calculated for the data $T_{n-1}$. A calculated result is shifted upwards (in the high-order direction) by one bit. Subsequently, the element mi(f,t) is calculated for the next data $T_{n-2}$. Then a calculated result for the data $T_{n-2}$ is added to the shifted result for the data $T_{n-1}$. In this manner, the calculation is repetitively carried out until data $T_0$ is processed. Likewise the element $\sum_f mi(f,t) \cdot y(f,t)$ for one frame is calculated. For example, when one frame of the template pattern shown in FIG. 13A and one frame of an unknown input pattern show in FIG. 13C are processed, mi(f,t) and mi(f,t).y(f,t) for the data $T_1$ shown in FIG. 13B is calculated. In this case, mi(f,t)=10 in the binary notation (corresponding to 2 in the decimal notation), and mi(f,t).y(f,t)=10 (corresponding to 2 in the decimal notation). The obtained binary values of elements mi(f,t) and mi(f,t) y(f,t) are respectively shifted upwards by one bit, so that shifted values of 100 and 100 are obtained, respectively. Next, mi(f,t) and mi(f,t).y(f,t) for the data $T_0$ shown in FIG. 13B is calculated. In this case, mi(f,t)=10 (corresponding to 2 in the decimal notation), and mi(f,t).y(f,t)=01 (corresponding to 1 in the decimal notation). Then, with respect to mi(f,t), a binary value of 100 and a binary value 10 is added to each other, so that an added value of 110 (corresponding to 6 in decimal) is obtained as a value of $\sum_f mi(f,t)$. Similarly, with respect to mi(f,t).y(f,t), a binary value of 100 and a binary value of 01 is added to each other, so that an added value of 101 (corresponding to 5 in decimal) is obtained as a value $\sum_f mi(f,t).y(f,t)$.

In this manner, when values of all the four elements for one frame are obtained in the frame register 69g, these values are added to accumulated values of respective elements which have been obtained until that time.

As can be seen from the above description, the structure of the SECU 69 is very simplified, and therefore, there can be achieved a high-speed calculation of the degree of similarity between the unknown input pattern and the template pattern. That is, the four elements Py, Pi, Pd and Pv with respect to the template pattern of the one word can be obtained immediately after the last frame of the template pattern is transferred to the template data register 69b.

It should be particularly appreciated that the elements for describing the degree of similarity can be obtained irrespective of the number of bits which are used for representing a value of each channel included in one frame of the template pattern, because the calculation in the SECU 69 is carried out starting from data positioned the most significant bit. For this reason, the SECU 69 can be used in common to the speaker-independent recognition and the speaker-dependent recognition, both of which are based on the binary time-spectrum pattern method. That is, it is possible to carry out the speaker-independent recognition and the speaker-dependent recognition by only one processors 200. In the conventional voice recognition system, one processor handles the speaker-independent recognition, and another processor handles the speaker-dependent recognition, because the algorithms between two types of recognition are different due to the difference between the dictionaries therebetween. Therefore, compared with the conventional system, the hardware of the system of FIG. 7 can be made compact.

Additionally, it should be appreciated that the calculation of the elements used for describing the degree of similarity is carried out by using SECU 69 having the hardware shown in FIG. 11. Therefore, the CPU 61 built in the processor 200 can afford to handle application programs stored in the program ROM 300 in addition to the voice recognition. In the conventional system, the calculation corresponding to the calculation implemented by the SECU 69 is performed by the CPU built in the processor. Therefore, the CPU must handle an extremely large quantity of data to perform the speech recognition. For this reason, the CPU in the conventional system hardly execute application programs.

Furthermore, the programs for the voice recognition is stored in the program ROM 300 which is externally connected to the processor 200 containing the CPU 61. Therefore, a variation in the programs is easily possible by exchanging the ROM 300 with another one or rewriting the contents thereof. On the other hand, a change of the programs which is executed by the CPU are impossible, because the conventional processor LSI designed exclusively for the voice recognition contains the ROM therein.

Figure 15:
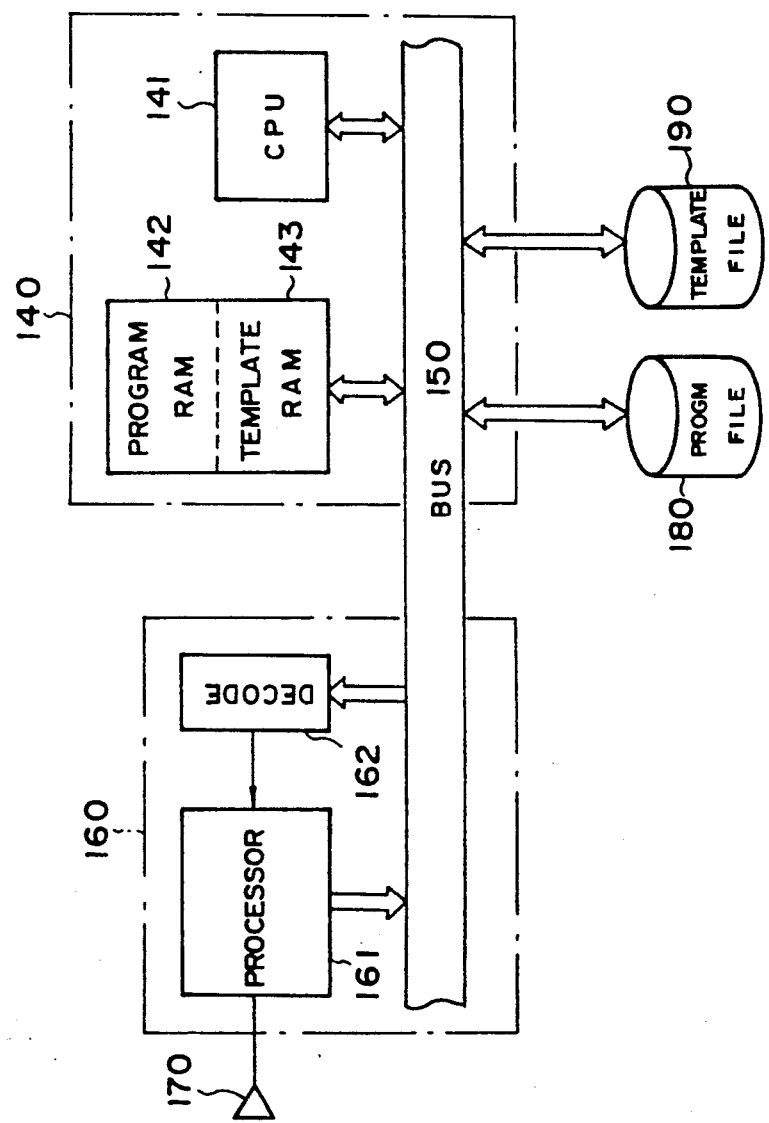
FIG. 15 is a block diagram of a system for implementing the configuration shown in FIG. 7.

FIG. 15 is a schematic block diagram of a voice recognition system using a personal computer. A general personal computer 140 has an extension slot which is connected to a bus 150 of a CPU 141. Therefore, a voice recognition system can be obtained by inserting a voice recognition board 160 into the extension slot. Only a processor 161 and a decoder 62 for carrying out address decoding are necessary to be mounted on the voice recognition board 160. These parts are connected to the bus 150. The CPU 141 executes all the functions which are provided by the processor 200. The programs and template data are stored in a hard disc 180 and a floppy disc 190, and are transferred to a program RAM 142 and a template RAM 143.

The present invention is not limited to the embodiments described above, but various variations and modifications may be made without departing from the scope of the present invention.

What is claimed is:

1. A speech recognition apparatus comprising:
   feature extracting means for extracting features of an unknown input voice and producing a corresponding unknown voice pattern;
   speaker-independent reference pattern storing means for storing speaker-independent reference patterns;
   speaker-dependent reference pattern storing means for storing speaker-dependent reference patterns;
   speaker-independent recognition means for calculating a degree of similarity between the unknown input pattern and each of the speaker-independent reference patterns and producing at least one candidate for the unknown input pattern;
   speaker-dependent recognition means for calculating a degree of similarity between the unknown input pattern and each of the speaker-dependent reference patterns and producing at least one candidate for the unknown input patterns;
   coefficient storing means for storing at least one coefficient for correcting the degree of similarity which is obtained by either one of the speaker-independent recognition means and the speaker-dependent recognition means;
   correcting means for multiplying said coefficient and the degree of similarity of said candidate supplied from a predetermined one of said speaker-independent recognition means and said speaker-dependent recognition means to generate corrected degrees of similarity of candidate; and
   identification means for comparing the degree of similarity of said candidate supplied from the predetermined one of the speaker-independent recognition means and the speaker-dependent recognition means with said corrected degree of similarity of said candidate related to the other recognition means supplied from said correcting means and for selecting one candidate having the highest degree of similarity among said degree of similarity of candidate and said corrected degree of similarity of candidate, said selected one candidate being the recognized result.

2. The speech recognition apparatus as claimed in claim 1, further comprising confirmation means for outputting the candidate having the highest degree of similarity to a speaker who utters the voice in order to confirm whether or not the candidate is correct.

3. The speech recognition apparatus as claimed in claim 2, wherein the identification means further comprises cancelling means for cancelling the candidate when it is confirmed to be incorrect; candidate selecting means for selecting other candidates one by one from among the candidates in decreasing order of degree of similarity; and coefficient adjusting means for adjusting a value of the coefficient when one candidate which is selected by the candidate selecting means and is confirmed to be correct by the confirmation means is one of the reference patterns to which the cancelled candidate does not belong, so that one of the reference patterns to which the cancelled candidate does not belong is selected as the first candidate when the same input voice is processed.

4. The speech recognition apparatus as claimed in claim 1, wherein the value of the coefficient is decided on the basis of the experiment.

5. The speech recognition apparatus as claimed in claim 1, further comprising adding means for adding a predetermined value to said corrected degree of similarity of candidate.

6. The speech recognition apparatus as claimed in claim 1, wherein the coefficient has a plurality of different values and wherein the speech recognition apparatus further comprises means of manually setting one of the predetermined values of the coefficient which is to be multiplied.

7. The speech recognition apparatus as claimed in claim 2, wherein the speaker-independent reference pattern storing means for storing a reference voice with respect to a public organization, and wherein the speech recognition apparatus further comprises telephone number storing means for storing telephone numbers; and communication means for communicating with a communication apparatus, and controlling means for selecting one telephone number corresponding to the recognition result which is output by the identification means from among the telephone numbers stored in the telephone number storing means, so that the selected telephone number is sent to the communication apparatus.

8. A speech recognition method comprising the steps of:
   producing an unknown input voice pattern of an unknown input voice from features extracted from the unknown input voice;
   calculating a degree of similarity between the produced unknown pattern and reference patterns which are composed of reference patterns used exclusively for speaker-independent recognition and reference patterns used exclusively for speaker-dependent recognition to thereby generate at least one candidate related to said speaker-independent recognition and at least one candidate related to said speaker-independent recognition;
   correcting the degree of similarity of said candidate a predetermined one of the speaker-independent recognition and the speaker-dependent recognition by multiplying said degree of similarity and a coefficient to thereby generate corrected degree of similarity of candidate;

comparing said degree of similarity of said candidate related to the predetermined one of said speaker-dependent recognition and said speaker-dependent recognition with said corrected degree of similarity of said candidate related to the other recognition; and selecting one candidate having the highest degree of similarity among said degree of similarity of candidate and said corrected degree of similarity of candidate, said selected one candidate being the recognized result.

9. The speech recognition method as claimed in claim 8, further comprising a step of outputting the candidate having the highest degree of similarity to a speaker who utters the voice in order to confirm whether or not the candidate is correct.

10. The speech recognition method as claimed in claim 9, further comprising steps of cancelling the candidate when it is confirmed to be incorrect; selecting other candidates one by one from among the candidates in decreasing order of degree of similarity; and adjusting a value of the coefficient when one candidate which is selected by the selecting step and is confirmed to be correct by the confirmation step is one of the reference patterns to which the cancelled candidate does not belong, so that one of the reference patterns to which the cancelled candidate belongs is not likely to be selected at the following recognition stage.

* * * * *